United States Patent [19]

Ueno

[11] Patent Number: 5,016,996
[45] Date of Patent: May 21, 1991

[54] REARVIEW MIRROR WITH OPERATING CONDITION DISPLAY

[76] Inventor: Yasushi Ueno, 2-34-2, Hino, Kohnan-ku, Yokohama, Japan

[21] Appl. No.: 431,069

[22] Filed: Nov. 3, 1989

[51] Int. Cl.$^5$ .......................... B60R 1/04; B60Q 1/28; B60Q 1/54
[52] U.S. Cl. .................................... 350/600; 340/441; 340/464; 340/466; 340/468; 340/475; 340/479; 362/83.1
[58] Field of Search ............... 340/464, 465, 466, 469, 340/475, 479, 441, 468, 485; 362/80.1, 83.1, 135, 140; 350/600, 601

[56] References Cited

U.S. PATENT DOCUMENTS

| D. 115,802 | 7/1939 | Soderberg | 362/83.1 |
|---|---|---|---|
| 2,561,582 | 7/1951 | Marbel | 350/600 |
| 2,580,014 | 12/1951 | Gazda | 350/601 |
| 2,676,311 | 4/1954 | Palazzolo | 340/475 |
| 3,320,586 | 5/1967 | Wagner | 340/464 |
| 3,364,384 | 1/1968 | Dankert | 340/464 |
| 3,665,392 | 5/1972 | Annas | 362/83.1 |
| 3,784,974 | 1/1974 | Hamashige | 340/464 |
| 4,588,267 | 5/1986 | Pastore | 362/83.1 |

FOREIGN PATENT DOCUMENTS

| 1555783 | 5/1970 | Fed. Rep. of Germany | 350/600 |
|---|---|---|---|
| 3408270 | 9/1985 | Fed. Rep. of Germany | 362/80.1 |
| 396789 | 6/1932 | United Kingdom | 340/475 |

Primary Examiner—Bruce Y. Arnold
Assistant Examiner—R. D. Shafer
Attorney, Agent, or Firm—Schwartz & Weinrieb

[57] ABSTRACT

A rearview mirror having an operating condition display which is positioned in the forward part of a driver's cabin and is disposed interiorly of the vehicle, the improved rearview mirror having an operating condition display comprises a speed display light which is provided so as to selectively illuminate a specific indicating portion when the vehicle is operated at a rate of speed within a particualr speed range, the display being electronically interconnected with the speedometer of an automobile.

14 Claims, 2 Drawing Sheets

REARVIEW MIRROR WITH OPERATING CONDITION DISPLAY

FIELD OF THE INVENTION

This invention relates to a rearview mirror having an operating condition display and more particularly is related to the technology of display devices for automobiles.

BACKGROUND OF THE INVENTION

Heretofore, as an example of a structure for informing a pedestrian or an oncoming vehicle of the speed of a travelling automobile, there has been developed a structure in which a plurality of lights are mounted upon the front surface of hood of a truck, and wherein for example, one light is individually illuminated for each incremento vehicle speed of 20 km/h, however, equipment of this kind is not provided upon other vehicles including automobiles.

Accordingly, a judgment not only by means of a pedestrian but also by means of the operator of an oncoming vehicle was been extremely difficult to make in order determine how fast the approaching vehicle is travelling, and therefore unexpected accidents hace frequently occurred.

OBJECT OF THE INVENTION

This invention has been made in view of the foregoing problems and an object of this invention is to provide a rearview mirror having an operating condition display which informs a pedestrian or the operator of an oncoming vehicle of the operating condition of the approaching automobile, wherein the device is mounted upon the rear surface of the rearview mirror which is disposed interiorly of the vehicle and immediately in front of the vehicle windshield so as to be visible through the windshield.

SUMMARY OF THE INVENTION

Namely, the foregoing and other features and objectives of the present invention are achieved by means of a rearview mirror, have an operating condition display, which is disposed within the interior of the automobile so as to be disposed immediately in front of the driver's seat, and which include a speed display light provided upon the rear surface of a housing for the rearview mirror which is selectively illuminated at specific indicating portion thereof so as to indicate a preset speed range as a result of being interlocked with speedometer of the automobile.

Furthermore, it is preferable to provide both or either one of a turn direction indicating light that is illuminated as a result of being interlocked with the turn signal light of the automobile, and a brake display light that is illuminated as a result of being interlocked with the brake light of the automobile.

According to the foregoing construction, the speed display light of the operating condition display provided upon the rear surface of the rearview mirror is selectively illuminated according to a predetermined travelling speed range of the automobile, and such light may be recognized by means of a pedestrian or the operator an oncoming vehicle through the windshield of the first vehicle. The oncoming vehicle or the pedestrian may therefore be able to recognize or determine the speed of the on coming automobile by means of the indication device of the present invention and they can therefore take an appropriate countermeasure.

Moreover, in the case that the turn direction indicating light that is illuminated as a result of being interlocked with the turn signal light of the automobile and the brake display light that is illuminated as a result of being interlocked with the brake light of the automobile are provided in addition to the speed indicating light, the recognition of the operating condition of the automobile becomes more accurate and the forecast becomes more positive.

BRIEF DESCRIPTION OF THE DRAWINGS

Various other objects, features, and attendant advantages of the present invention will become more fully appreciated from the following detailed description, when considered in view of the accompanying drawings in which like reference charcters designate like or corresponding parts throughout the several views, and wherein.

DETAILED DESCRIPTION OF THE PREFERRED EMBODIMENT

Figure 1:
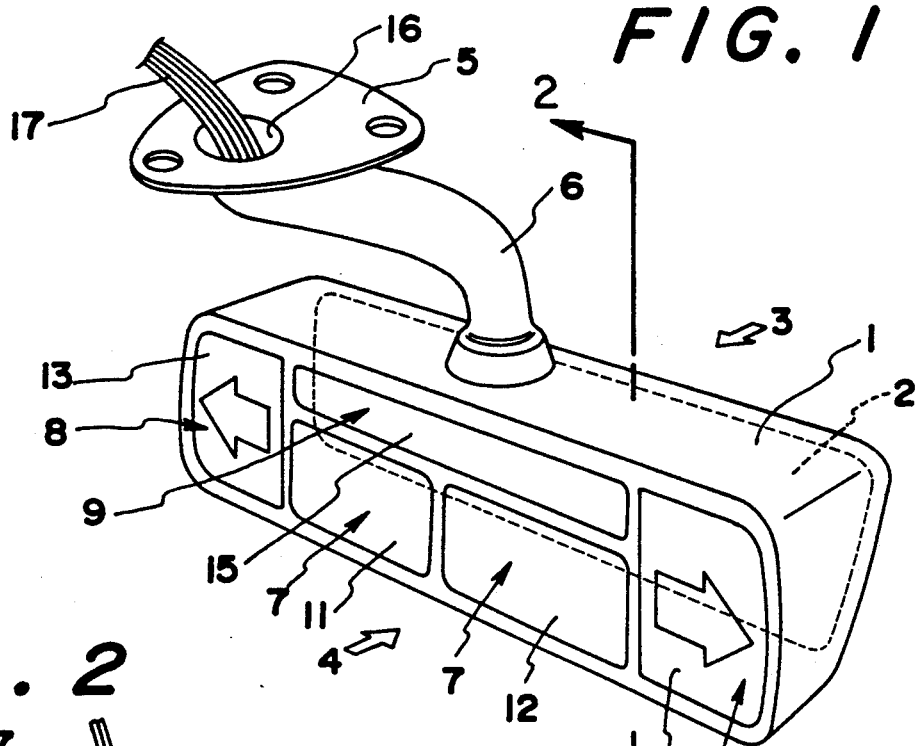
FIG. 1 is a perspective view showing an embodiment of a rearview mirror with an operating condition display constructed according to this invention.
Figure 2:
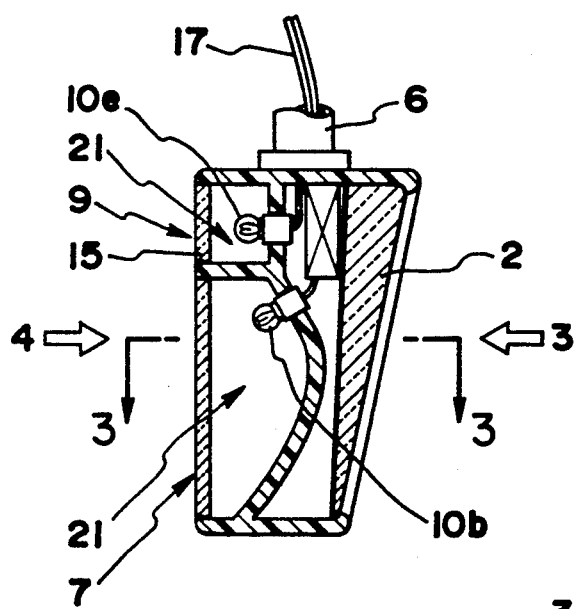
FIG. 2 is a cross section taken along the line 2—2 in FIG. 1.
Figure 3:
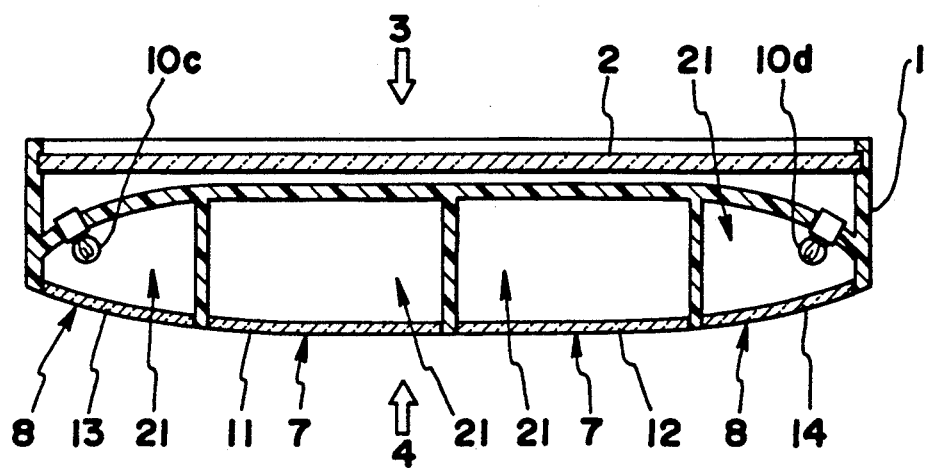
FIG. 3 is a cross section taken along the line 3—3 in FIG. 2.
Figure 4:
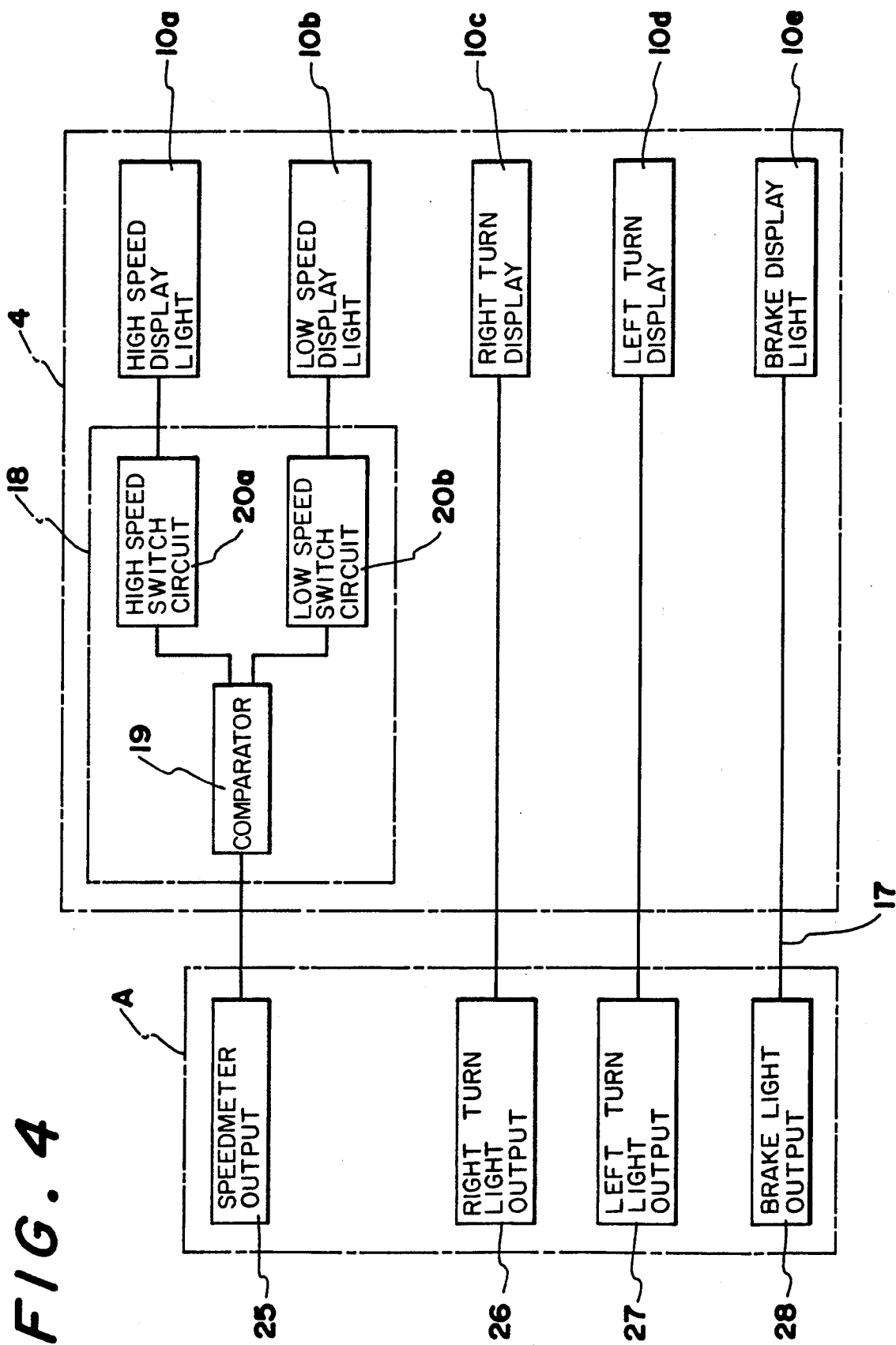
FIG. 4 is a block diagram of the device of the present invention showing the interconnection of the speed, brake light, and left and right turn displays with the speedometer, brake light, and left and right turn output means of the vehicle.

An embodiment of the rearview mirror with having an operating condition display constructed according to this invention will now be described by referring to the appended drawings.

Reference numeral 1 denotes a box molded from a suitable synthetic resin, and a rearview mirror portion 3 comprising a conventional mirror 2 is provided upon the front surface of the substantially rectangular box or housing 1 while an operating condition display 4 is provided upon the rear surface (that is, the surface seen through the windshield) of the box 1, a support arm 6 formed with a mounting portion 5 for fixing the device to the chassis of a front ceiling portion of the driver's cabin of the automobile projecting upwardly from the surface of the upper wall of the box. The operating condition display 4 is composed of a speed display display portion 7 comprising a high speed display and a low speed, a right and left turn indicating portion 8, and a brake display portion, and is formed with light chambers 21, 21 . . . provided by means of sectioning the cavity of the box 1, each light chamber 21 being provided with a light bulb 10 (display lights 10a, 10b, . . . , 10e). In addition the front surface is covered by means of different filter lenses as will be described hereinafter.

| combination of each display and filter lens | |
|---|---|
| display | filter lens |
| speed display portion 7 (high speed) | yellow filter lens 11 |
| speed display portion 7 (low speed) | blue filter lens 12 |

-continued

| combination of each display and filter lens | |
|---|---|
| display | filter lens |
| turn display portion 8 (right) | right arrow mark filter lens 13 |
| turn display portion 8 (left) | left arrow mark filter lens 14 |
| brake display portion 9 | red filter lens 15 |

Furthermore, the light bulb 10 disposed within each light chamber 21 is connected to a conductor cable 17 which is introduced by means of a harness hole 16 of the mounting portion 5 so as to be routed through the support arm 6, and the speed display lights 10a, 10b are connected to a speedometer output 25 of the automobile A and a controller 18. The low speed side speed display 10b, which is provided with the blue filter lens 12, is illuminated as a result of turning a low speed side switch circuit 20b ON when the vehicle is travelling at a rate of which is within the range of 0~50 Km/h by means of a speed signal inputted into a comparator 19 of the controller 18, and similarly, when the vehicle is travelling at a rate of which which is within the range exceeding 50 km/h, the high speed side speed display 10a provided with the yellow filter lens 11 is illuminated as a result of turning a high speed side switch circuit 20a ON by means of a speed signal conducted to comparator 19 of controller 18 from speedometer 25. Furthermore, the right and left directional turn display lights 10c, 10d are connected in parallel to the directional signal lights of the automobile A, and the right turn display light 10c connected with a right turn light output 26 and the right arrow mark filter lens 13, as well as the left turn display light 10d connected with a left turn light output 27 and the arrow mark filter lens 14 are connected by means of the conductor cable 17 to the vehicle power supply. Moreover, the brake display light 10e is connected in parallel to the brake light of the automobile side A, and the brake display light 10e connected with a brake light output 28 and the red filter lens 15 are similarly connected by means of the conductor cable 17.

The rearview mirror its operating condition display of the foregoing construction enables the pedestrian or the driver of an oncoming vehicle to recognize the operating condition display 4 provided upon the rear surface of the box and visible through the windshield of the automobile equipped with the device of the present invention whereby the same displays the operating condition of the vehicle, such as, for example the speed, turning, and braking condition of the vehicle to the pedestrian or the operator of the oncoming vehicle by mean of the selective lighting of the various components thereof which positively informs the pedestrian or other vehicle operator, by means of the filter colors and the arrow mark displays of the various operating conditions of the vehicle.

By the way, in the foregoing embodiment, the speed display portion 7 is indicated as being divided into two steps, that is, the high speed and the low speed ranges, however, such can also be displayed by dividing the same into many steps and in addtion, the speed itself can be digitally displayed.

As described in the foregoing, the rearview mirror having an operating condition display according to this invention may be able to convey accurate operating conditions of an automobile to the pedestrian or the operator of an oncoming vehicle as a result of being disposed in the forward portion of the automobile, that is, within the vicinity of the front windshield so as to be visible to the pedestrian or other vehicle operator, whereby such device can in fact facilitate judgmental decisions concerning vehicular traffic, whereby and the practical effect of this invention after putting the same into practice is extremely great.

It is, of course, to be understood that the present invention is, by no means, limited to the specfic showing in the drawings but also comprises any modifications there to within the scope of the appended claims. Consequently, within the scope of such appended claims, the present invention may be practiced otherwise than as specifically described herein.

What is claimed is:

1. A rearview mirror in combination with an operating condition display for a motor vehicle, comprising:
a box-type housing;
means for mounting said housing upon said motor vehicle;
mirror means mounted within one side of said box-type housing and disposed rearwardly with respect to said vehicle for serving as a rearview mirror upon said vehicle for a driver of said vehicle; and
operating condition display means mounted within an opposite side of said box-type housing in front of said mirror means and disposed forwardly with respect to said vehicle for providing visual operating condition information to oncoming vehicular traffic and pedestrians disposed forwardly of said motor vehicle,
said operating condition display means including left and right turn indicating means operatively connected to left and right turn switching means disposed upon said vehicle, vehicle braking indicating means operatively connected to braking means disposed upon said vehicle, and vehicle speed indicating means operatively connected to speedometer means disposed upon said vehicle.

2. A rearview mirror-operating condition display combination as set forth in claim 1, wherein:
said vehicle speed indicating means comprises a plurality of speed indicating display elements which are separately and individually operative within predetermined speed ranges of said vehicle.

3. A rearview mirror-operating condition display combination as set forth in claim 2, wherein:
said plurality of speed indicating display elements comprises two speed indicating display elements predeterminedly operative within relatively high and relatively low speed ranges of said vehicle.

4. A rearview mirror-operating condition display combination as set forth in claim 3, wherein:
said relatively low speed range of said vehicle comprises a vehicle speed within the range of 0-50 km/hr; and
said relatively high speed range of said vehicle comprises a vehicle speed which exceeds 50 km/hr.

5. A rearview mirror-operating condition display combination as set forth in claim 3, wherein:
said two speed indicating display elements comprise two different illumination means.

6. A rearview mirror-operating condition display combination as set forth in claim 5, wherein said two different illumination means comprise:
means defining two separate compartments within said box-type housing with one side of each compartment being open;

an illumination lamp disposed within each one of said two compartments;

first colored filter means disposed over said open side of a first one of said two compartments such that upon illumination of said illumination lamp within said first one of said two compartments as a result of said vehicle being operated at a first predetermined speed, a first colored illumination indicia will be displayed; and second colored filter means, different from said first colored filter means, disposed over said open side of a second one of said two compartments such that upon illumination of said illumination lamp within said second one of said two compartments as a result of said vehicle being operated at a second predetermined speed, a second colored illumination indicia will be displayed.

7. A rearview mirror-operating condition display combination as set forth in claim 6, wherein:

said first colored illumination indicia comprises a yellow display corresponding to said relatively high operating speed range of said vehicle; and said second colored illumination indicia comprises a blue display corresponding to said relatively low operating speed range of said vehicle.

8. A rearview mirror-operating condition display combination as set forth in claim 7, wherein:

said means for mounting said housing upon said motor vehicle comprises a support post secured to an interior ceiling portion of said vehicle whereby said rearview mirror is an interior rearview mirror for said vehicle.

9. A rearview mirror-operating condition display combination as set forth in claim 8, wherein:

said support post comprises a hollow tubular conduit for housing electrical cables for providing electrical power to said operating condition display means.

10. A rearview mirror-operating condition display combination as set forth in claim 1, further comprising:

partition means disposed internally within said box-type housing for dividing the interior portion of said box-type housing into separate compartments disposed in a lateral and vertical array with respect to each other; and illumination means mounted upon said partition means and disposed within each one of said separate compartments for illumination in order to display an operating characteristic of said vehicle as determined by said operating condition display means.

11. A rearview mirror-operating condition display combination as set forth in claim 10, wherein:

said partition means is integrally formed with said box-type housing from a synthetic resin material.

12. A rearview mirror-operating condition display combination as set forth in claim 10, wherein:

as viewed from a pedestrian and oncoming traffic location, said left and right turn indicating means compartments are defined within extreme left and right locations of said box-type housing, said vehicle speed indicating means compartment is disposed within a lower central portion of said box-type housing, and said vehicle braking indicating means compartment is located within an upper central portion of said box-type housing.

13. A rearview mirror-operating condition display combination as set forth in claim 10, wherein:

said vehicle braking indicating means compartment is covered by means of a red colored filter means so as to display a red illumination signal to said pedestrians and said oncoming vehicular traffic when said vehicle is being operated in a braking mode.

14. A rearview mirror-operating condition display combination as set forth in claim 10, wherein:

said right and left turn indicating means compartments are covered by means of filter means having right and left arrow indicia means disposed thereon, respectively, so as to display a right and left turn signal, respectively, to said pedestrians and said oncoming vehicular traffic when said vehicle is being operated in a right and left turn mode, respectively.

* * * * *